April 5, 1949.  W. F. OCENASEK  2,466,325

SAW GUARD FOR ADJUSTABLE-SAW SAW TABLES

Filed July 18, 1945  3 Sheets-Sheet 1

INVENTOR
William Ferdinand Ocenasek
Albert F. Nathan
ATTORNEY

April 5, 1949. W. F. OCENASEK 2,466,325
SAW GUARD FOR ADJUSTABLE-SAW SAW TABLES
Filed July 18, 1945 3 Sheets-Sheet 2

INVENTOR
William Ferdinand Ocenasek
Albert F. Nathan
ATTORNEY

April 5, 1949.   W. F. OCENASEK   2,466,325
SAW GUARD FOR ADJUSTABLE-SAW SAW TABLES
Filed July 18, 1945   3 Sheets-Sheet 3

INVENTOR
William Ferdinand Ocenasek
Albert F. Nathan
ATTORNEY

Patented Apr. 5, 1949

2,466,325

UNITED STATES PATENT OFFICE 2,466,325

SAW GUARD FOR ADJUSTABLE-SAW SAW TABLES

William Ferdinand Ocenasek, South Plainfield, N. J., assignor to Kearney & Trecker Corporation, West Allis, Wis., a corporation of Wisconsin Application July 18, 1945, Serial No. 605,690

1 Claim. (Cl. 143—159)

The present invention concerns improvements in guards for power saws and proposes an improved method and means for protecting the operator against the hazards and risks attending the operation of such machines under the many and varied conditions of their use. The primary aim of the invention is to render available a guard that will be safe, not only in the sense that it will cover the saw before and after a given sawing operation, but a guard that will give the much needed protection to the operator during the course of a sawing operation.

The invention further undertakes to provide a saw guard that will remain in saw guarding relation during saw adjusting operations, such as during raising and lowering operations for depth of cut, and during tilting operations for bevel sawing, and which in the performance of such operations the guard will automatically adapt itself to the new condition without need for requirement for removal. With a similar end in view, the invention also aims to provide a practical guard whose essential supporting elements remain in position ready for use, during saw blade changing operations. Heretofore, guards have been so organized that it became necessary to remove them from the machines each time the saw was changed, and that practice tended soon to lead the operator into leaving the guard off. With this invention, a new guard is provided having relatively shiftable side panels, either of which may be lifted to permit access to and withdrawal of the table insert plate and subsequently the removal of the saw from its arbor. After a new blade is mounted and the insert plate replaced, the raised side panel must be lowered to its normal position close to the table and the saw, before it becomes practical to use the saw.

Saw guards have been designed with movable side panels but they have either been of too complex nature to be practical and hence unsafe, or of a character unadapted for many of the usual cutting operations. In many cases the guard could not be used at all or portions of the saw blade became exposed during use thereby presenting dangerous conditions which are, of course, rendered more dangerous by virtue of the latent and possibly unforeseen development. Still other guards have been developed employing extended supporting members and mechanisms requiring careful attention in their manipulation and setting whenever the position of the saw is changed and such devices, because of their lack of rigidity, and because of their complicated nature have not been favorably received either by the workmen or by the safety councils of different States.

The present invention aims to provide a saw guard that is compact and simple in its nature and a guard that will meet not only with the approval of the safety underwriters but also with the workmen. An improperly designed guard or one that functions in a faulty manner, on a machine as dangerous as a circular saw, is often worse than no guard at all for in the latter event an alert operator can at least see the saw blade and take the necessary precautions with his hands and fingers, whereas, in the former eventuality, the operator's confidence in the efficiency of the guard may have been misplaced.

In meeting and overcoming the problems attending the use and operation of the table-type circular saw, it is now proposed to provide a guard composed essentially of three members, namely, a top or cover member overlying the saw blade, and two side members, one disposed at each side of the saw, the three members together forming an inverted substantially U-shaped enclosure. Moreover, each side member is hinged to the top member in a manner whereby it may be shifted, in its own plane, slightly rearwardly and upwardly by the workpiece as the latter is fed to the saw. If the workpiece is wide enough to extend under both side panels, both side panels partake of such movement, but if the workpiece extends under but one of the side panels, only that one side panel moves and the other stays down and keeps that side of the saw fully guarded.

When the plane of the saw is tilted relative to the table top, the independently movable side panels automatically adjust themselves, in planes paralleling the plane of the saw, to the relatively inclined surface of the work table at each side of the saw and thereafter individually and independently respond to the movement of the workpiece.

To the end of avoiding sliding joints and connections and the problems incident thereto of which the collecting of wood dust and chips and the resulting impairment of operation is a primary hazard, the invention proposes sturdy parallel-link pivotal supports for each of the side panels. By pivoting the upper ends of the panel supporting links to the cover member at points well in advance of the points of connection with the panels, the latter are caused to "trail" and thereby offer little resistance to bodily shifting movement when engaged straight forward by the workpiece. And as the panels are never moved by the work to positions wherein the supporting links are swung much beyond a horizontal position, the side panels cannot "hang-up" or stick in an elevated position on completion of the sawing operation.

The parallel-link construction features the further advantage of adaptability for manual movement of either or both side panels to positions above and slightly forward of their normal operating positions. When so positioned the underside of the guard is completely open at one or both sides of the saw and inspection of the saw blade or removal of the table-top insert, and the saw, is readily accomplished without otherwise removing or disarranging the guard elements. On completing the inspection or the operation of changing the saw, the side panels are each revolved about their double pivots back to their normal position at each side of the saw.

As an additional safety feature, this invention proposes separate anti-kick backs mounted at each side of the plane of the saw and slightly rearwardly thereof. Each anti-kick back comprising a toothed member that is pivoted to the upper supporting rail in a manner whereby the lower toothed ends hang in position to be engaged by the surface of the work as it is propelled past the saw. With separate anti-kick members at each side of the saw, not only are both portions of the stock being cut independently and firmly held against return movement but that each anti-kick member automatically is self adjusting to the inclination of the saw and/or to the thickness of stock that is passing thereunder. Either anti-kick back and the associated side panel may be swung to an elevated out-of-the-way position when the particular operation to be performed requires the bringing of the ripping fence up relatively close to the saw as, for example, for the taking of a cut relatively close to the edge of the stock. In such cases the ripping fence functions as a guard for that side of the saw.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:

Figure 1 of the drawings is a side view of a saw guard embodying the invention, and in which the saw, tilting arbor, and saw table are illustrated diagrammatically.

Figure 1:
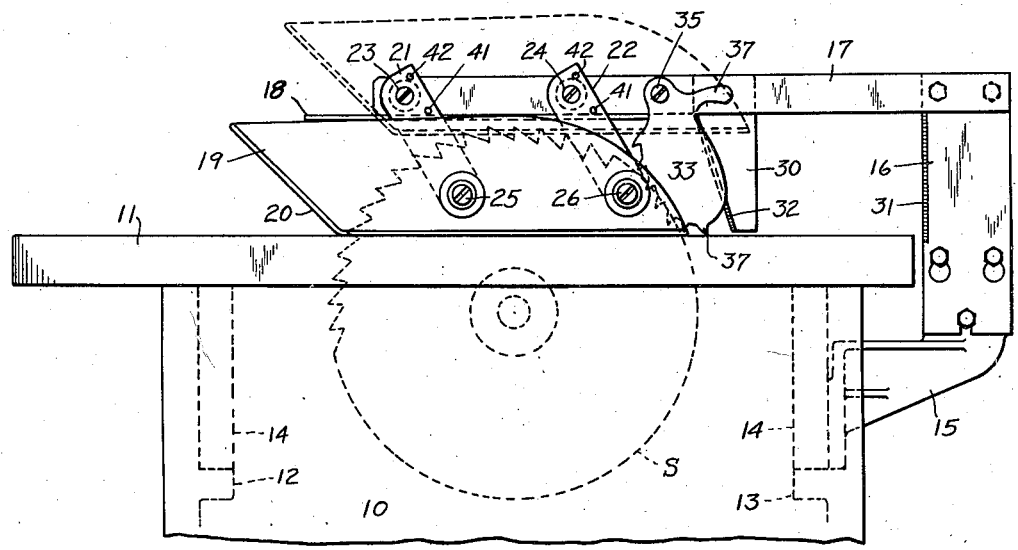
Figure 2:
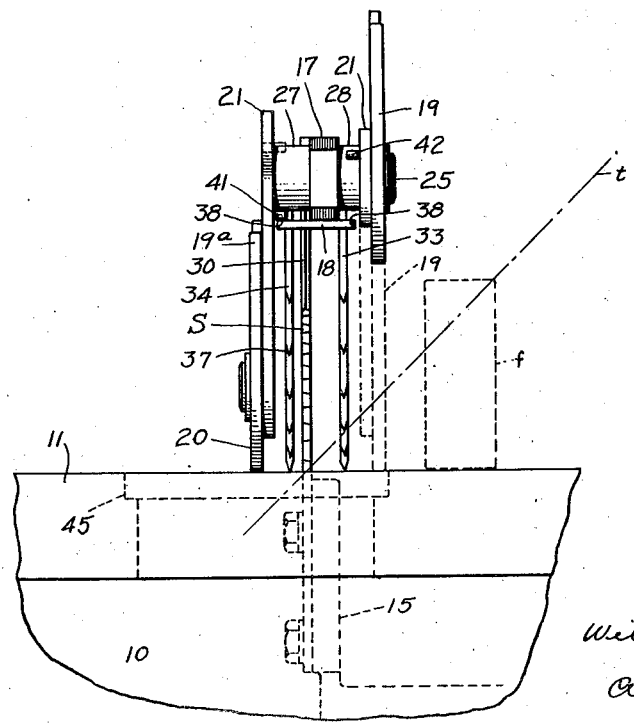
Fig. 2 is a front view of the guard with one panel in raised position and the ripping fence (shown in dotted lines) placed relatively close to the saw for a narrow ripping operation.
Figure 3:
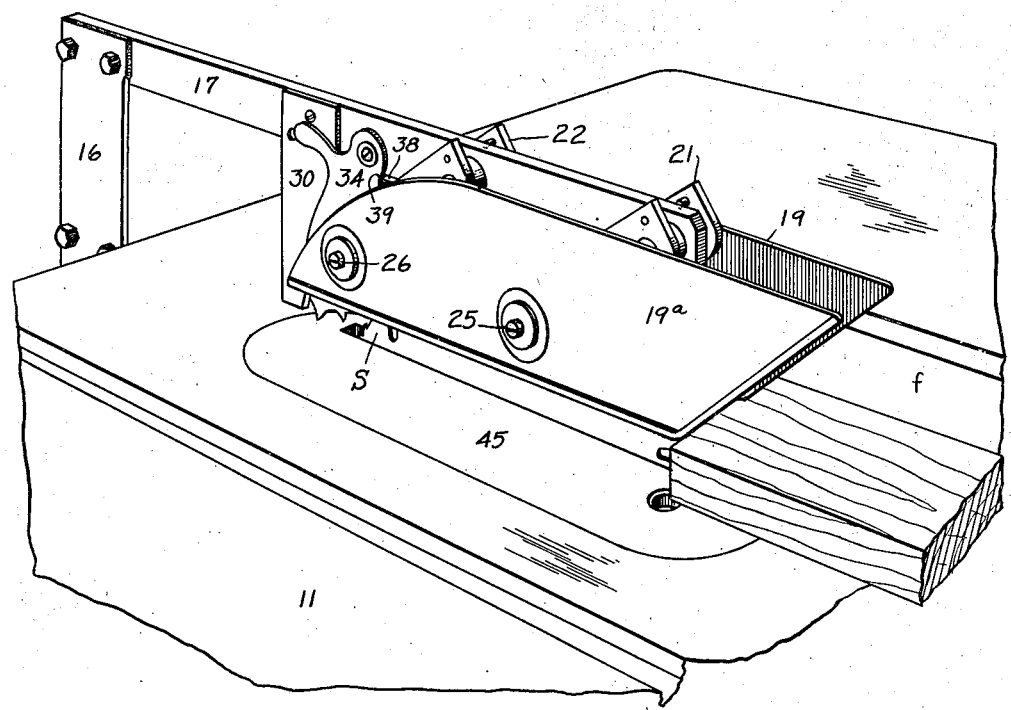
Fig. 3 is a perspective view of the guard in the performance of an ordinary sawing operation.

Referring more particularly to Figures 1 and 2, the invention is illustrated in connection with a table type tilting arbor saw having a standard 10, a top 11, and arcuate end journals 12 and 13 that support a tilting bracket 14. The saw arbor, bearings and power plant are mounted for vertical adjustment on the tilting bracket in a known manner, such as typified in my prior Patent #2,261,696, whereby the saw S may be adjusted for depth of cut as will be understood. The saw tilting means may also be of standard construction, as illustrated in my aforesaid patent, the axis of tilt being in the plane of the work surface of the table, and capable of tilting the saw through an angle of 45° from vertical, as represented by the line $t$ in Fig. 2.

The rear trunnion of the tilting bracket 14 has secured thereto a projecting bracket 15, from which rises a detachable splitter member 16. The splitter 16 is of substantial thickness and is of a width ably to support, at its upper end, a forwardly extending and saw overlying top-rail member 17. The underside of the top rail has a top guard member 18 secured thereto that extends forwardly beyond the end of the top rail and effectively guards the saw from above. If desired, the top guard 18 may, of course, be an integral part of the rail 17.

Figure 4:
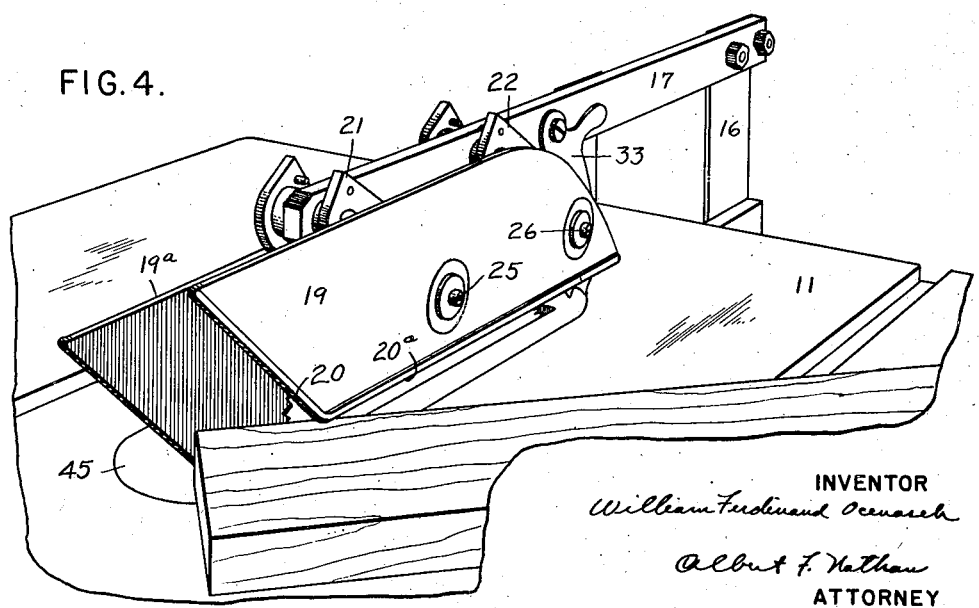
Fig. 4 is a perspective view illustrating the relation of the parts during a mitering operation.

At each side of the saw S, a side guard panel 19 and 19$^a$ is located. The panels are in height at least equal to the maximum elevation of the saw, and have their leading ends beveled as at 20 to facilitate the passing of the stock thereunder. Each panel is supported from the top rail, by two parallel arranged links 21 and 22 which lie between the vertical planes of the outer face of the rail 17 and the inner face of the side guard panel. Headless screws or substantially flush pivot pins 23, 24 at the rail ends of the links provide the pivotal connections with the rail whereby the panel may be swung past the pivotal axis as illustrated in Fig. 4 and by dotted lines in Fig. 1. The lower ends of the links 21 and 22 have the side guard panel 19 pivotally connected at 25 and 26 therewith. The opposite side panel 19$^a$ is similarly mounted.

The parallel link and connections just described provides for free mobility of each of the side panels 19 and 19$^a$ in an orbital path about pivot points 23, 24, while never-the-less maintaining its plane parallel with the saw and the lower edge 20$^a$ substantially parallel with the work surface of the table at all times.

As illustrated more clearly in Fig. 1, the floating pivots 25 and 26 normally occupy a position rearwardly of the fixed pivots 23 and 24 and whereby a workpiece when pushed along the surface of the table and against the beveled edge 20 of the guard, causes the guard to shift simultaneously rearwardly and upwardly. If the cut to be taken is relatively close to one edge of the stock so that the stock does not protrude from under both side guard panels, only the one panel will be shifted and the other will remain down and keep that side of the saw fully covered. If an exceptionally narrow cut is to be taken the ripping fence, indicated at $f$, may be brought up close to the saw by lifting one of the panels out of the way.

As illustrated more clearly in Fig. 1, each pair of supporting links 21 and 22 extend downwardly and rearwardly from their fixed pivotal connections 23 and 24 with the rail, and accordingly, any force applied to the panels from above, accidentally or otherwise, tends to retain the guard panels in guarding relation with the saw. Also, the extended portion of the top guard member 18 effectively shields the saw and prevents undue or accidental movement of the panels except when the latter are actuated by the workpiece in a horizontal direction.

As shown in Fig. 2, the top guard 18 extends forwardly and laterally to the sides and effectively closes the opening between the side panels 19 and 19ª from above. The width of the space between the panel supporting links may be relatively wide or narrow as desired and a preferred width is one that will accommodate a standard wide face cutter such as a dado head. Right and left spacers 27 and 28 at the fixed pivot connections 23, 24 are made of the requisite length for a given spacing of the guard panels.

Immediately to the rear of the saw and intermediate the fixed pivot points of the side guards and the main supporting splitter 16, a secondary splitter 30 is suspended from the supporting rail 17. The splitter 30 extends toward the table top but does not engage the surface thereof. The guard assembly, by virtue of being mounted to the tilting bracket of the saw, tilts with the saw and coplanar relation of the guard and splitters with the saw is at all times assured. Both splitters 16 and 30 have their leading edges beveled or sharpened as at 31 and 32 so as to readily be received within the saw kerf, the splitter 30 nearest the saw functioning to hold the kerf open and prevent binding of the stock on the saw, until the splitter 16, second in line and some distance removed, comes into action.

Also carried by the supporting rail 17 are antikick back members 33 and 34, each being pivotally supported at 35 and one at each side of the rail and depending to positions adapted to engage the stock at both sides of the saw and saw cut. The forward edge of each anti-kick back member is generally cam shaped and provided with spurs 37. As the workpiece is fed past the saw, the leading edge engages and rocks the anti-kick backs until the piece passes under the spurs, thereafter any tendency of the stock to be thrown back by the saw is definitely resisted by the digging in of the spur teeth of the anti-kick backs and their resulting reaction against the pivots 35. Each anti-kick back operates independently and either may be revolved out of effective position by operating the handle 37.

Figure 6:
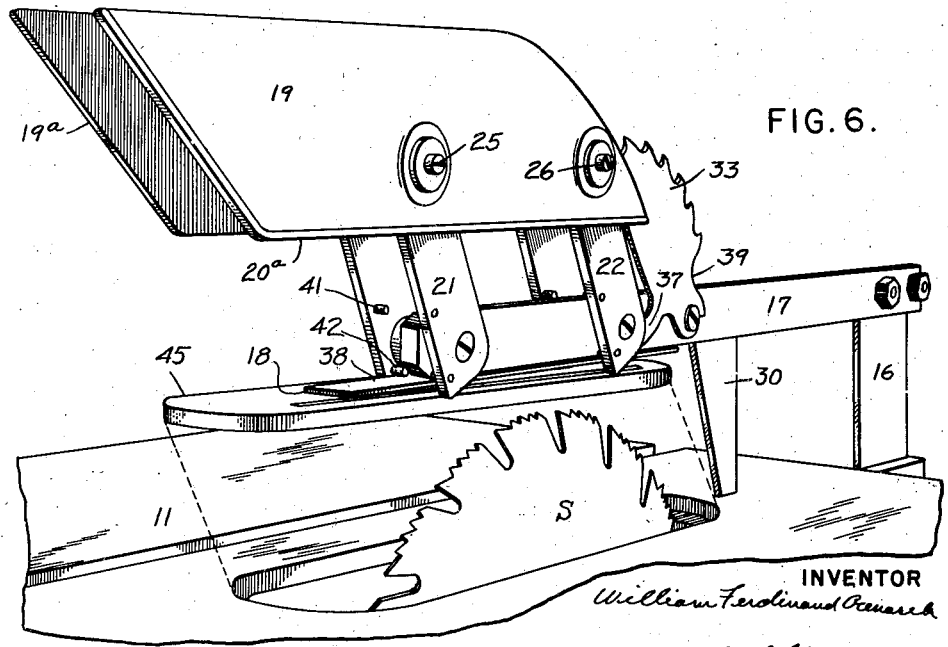
Fig. 6 illustrates the positions of the parts when changing a blade.

As illustrated in Figs. 2 and 6, the top guard member 18 extends laterally of the supporting rail 17 and forms ledges 38 along each side thereof. When the anti-kick backs are revolved out of action and to a position such as represented in Fig. 6, the handle portion 37 rests upon the ledge 38 and the anti-kick backs retain themselves, by their own weight, in such positions. When the anti-kick backs are returned to their normal operating positions, the neck portions 39 engage the ends of the ledges 38 of the top guard 18 and the spurs of the anti-kick backs are definitely held out of engagement with the table top.

Each of the parallel link elements 21 and 22 carry short inwardly projecting pins 41 and 42 located near the fixed pivots 23 and 24. The pin 41 is positioned in the link at a point wherein it rests atop the ledge 38 when the side guard panel 19 is in its normal working relation with the saw and table top, see Fig. 1. The other pin 42 is positioned at a point wherein it rests atop the ledge 38 when the guard panel is revolved to an ineffective position such as illustrated in Fig. 6. In the position last referred to, the connecting links 21 and 22 are moved slightly past the vertical position, and automatically constrained from moving further by the coaction of the pins 42 and ledge 38.

The means for holding the side panels independently in effective or ineffective position just described avoids the use of auxiliary weights, chips, springs and the like, and is moreover readily and conveniently operated. In changing a saw blade, for example, both side panels and also the anti-kick backs may be revolved to their ineffective positions as illustrated in Fig. 6. The saw blade becomes thereby completely exposed and ample room and working space is provided under the fixed rail in which to remove the table-insert plate 45 and thereafter the saw S from its mandrel.

Figure 5:
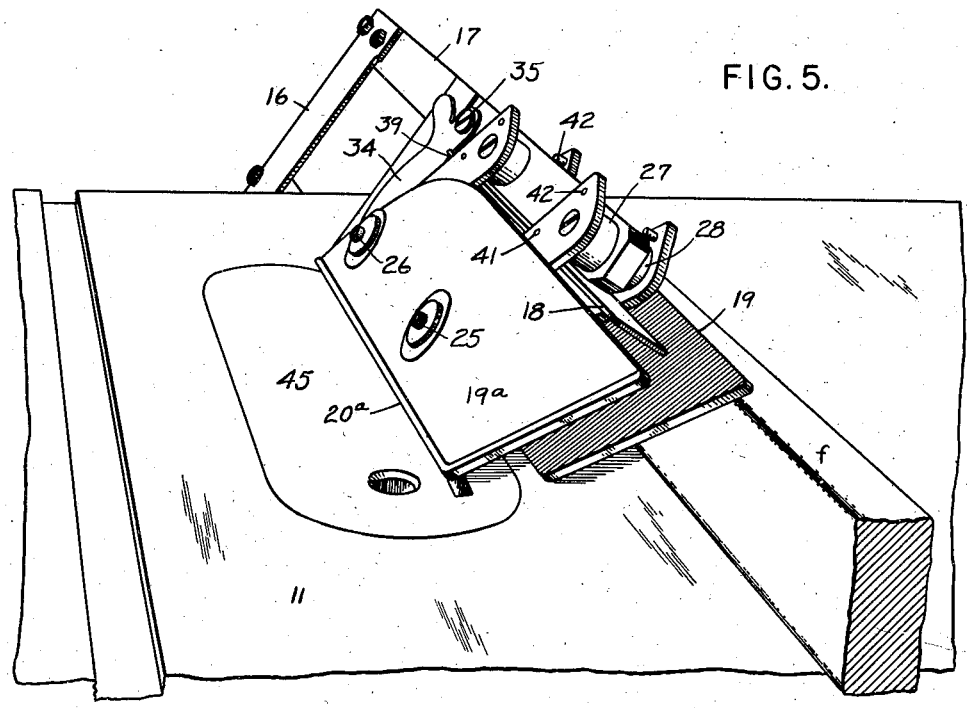
Fig. 5 illustrates the guard in tilted position.

Fig. 4 illustrates a typical mitering operation wherein the stock to be removed does not extend under both side panels. In such cases, as well as with short-end cross-cutting operations, etc. one of the side panels yields, and the other stays close to the table all along the saw. Fig. 5 illustrates the saw guard in tilted position, in conformity with the tilted position of the saw. As the saw and guard assembly is laid over, the side panel nearest the table surface yields but continues to remain in saw guarding relation.

A saw guard of this character possesses, it will be seen, a degree of versatility heretofore unapproached in this field, while nevertheless serving at all times and under all conceivable conditions of use of the saw, to perform its essential function of protecting the user by keeping the saw effectively covered. A device constructed in accordance with this invention, also eliminates the need and possible desire of the user to remove it from the machine when performing a close ripping operation, for example, or special operations involving bevel cuts, mitre cuts or compound angle cuts, dadoing or rabbeting cuts, for in performing any of such operations the guard of this invention remains in guarding relation with the saw and does not interfere or hinder the operator. Nor is there any need, with a guard embodying the principles of this invention, to remove the guard in order to change a blade or a cutter head, and having eliminated the need for removing, the possibility of inadvertently leaving off the guard, and the dangerous condition that ensues consequent thereupon, is also eliminated.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claim:

Having thus revealed this invention, I claim as new and desire to secure the following combinations and elements, or equivalents thereof, by Letters Patent of the United States:

In a circular sawing machine having a table and tiltable saw adapted to be elevated upwardly therethrough, a guard mechanism comprising a splitter tiltable with the saw and uprising at the rear of the table in the plane of the saw, a straight bar provided with a ledge projecting from each side of its lower edge and said bar being rigidly secured to the upper end of the tiltable splitter and extending forwardly therefrom parallel with the table and in the plane of the saw and permanently maintained at a fixed distance from the axis thereof, two independently movable guard wings pivotally carried by said straight bar, on opposite sides thereof to guard the saw on each of its sides, said guard wings being flat and having their front edges inclined upwardly and forwardly, each guard wing being supported by two parallel links pivoted respectively to the inner face of its associated wing and the corresponding outer side of the said straight bar, said links being of such length as will permit the wings normally to rest on the table when the links are sloping downwardly and rearwardly, and to permit said links to assume a position sloping steeply upwardly and forwardly when the wings are raised rearwardly and upwardly until their lower edges are entirely above the elevation of said straight bar and detent means cooperating with said ledge for determining the lowermost position of said wings and for retaining them in their uppermost position.

WILLIAM FERDINAND OCENASEK.

REFERENCES CITED

The following references are of record in the file of this patent:

UNITED STATES PATENTS

| Number | Name | Date |
|---|---|---|
| 286,710 | Kuhlmann | Oct. 16, 1883 |
| 1,496,212 | French | June 3, 1904 |
| 1,101,515 | Adam | June 30, 1914 |
| 1,255,886 | Jones | Feb. 12, 1918 |
| 1,879,280 | James | Sept. 27, 1932 |
| 2,095,330 | Hedgepeth | Oct. 12, 1937 |
| 2,163,320 | Hammond | June 20, 1939 |
| 2,257,459 | Gardner | Sept. 30, 1941 |
| 2,352,235 | Tautz | June 27, 1944 |

FOREIGN PATENTS

| Number | Country | Date |
|---|---|---|
| 4,290 | Great Britain | Mar. 26, 1886 |
| 487,226 | France | Mar. 26, 1918 |
| 511,595 | Germany | Oct. 31, 1930 |